United States Patent
Kim

(10) Patent No.: US 9,414,391 B2
(45) Date of Patent: Aug. 9, 2016

(54) METHOD AND SYSTEM FOR SERVICING CALL WITH DOORPHONE USING TELEMATICS

(71) Applicant: Hyundai Motor Company, Seoul (KR)

(72) Inventor: Bo Geun Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/795,906

(22) Filed: Jul. 10, 2015

(65) Prior Publication Data

US 2016/0143022 A1  May 19, 2016

(30) Foreign Application Priority Data

Nov. 19, 2014 (KR) .......................... 10-2014-0161770

(51) Int. Cl.
| | |
|---|---|
| *H04M 3/42* | (2006.01) |
| *H04W 72/04* | (2009.01) |
| *H04M 1/725* | (2006.01) |
| *H04W 12/06* | (2009.01) |
| *H04W 76/02* | (2009.01) |
| *H04N 7/18* | (2006.01) |

(52) U.S. Cl.
CPC ........ *H04W 72/048* (2013.01); *H04M 1/72569* (2013.01); *H04N 7/186* (2013.01); *H04W 12/06* (2013.01); *H04W 76/02* (2013.01)

(58) Field of Classification Search
CPC ... H04W 72/048; H04W 12/06; H04W 76/02; H04M 1/72569; H04N 7/186
USPC .............. 455/415, 418, 414.1, 420, 411, 410; 701/2, 31.4
See application file for complete search history.

(56) References Cited

U.S. PATENT DOCUMENTS

| | | | | |
|---|---|---|---|---|
| 2006/0063517 | A1* | 3/2006 | Oh | H04M 3/42348 455/415 |
| 2006/0142880 | A1* | 6/2006 | Deen | G05B 15/02 700/19 |
| 2007/0216764 | A1* | 9/2007 | Kwak | H04L 12/64 348/14.06 |
| 2010/0127847 | A1* | 5/2010 | Evans | G06F 3/04817 340/461 |
| 2015/0363989 | A1* | 12/2015 | Scalisi | G07C 9/00904 348/143 |

FOREIGN PATENT DOCUMENTS

| | | | | |
|---|---|---|---|---|
| GB | 2377582 | A * | 1/2003 | .......... H04M 1/0291 |
| JP | 2008252166 | A | 10/2008 | |

(Continued)

OTHER PUBLICATIONS

Korean Office Action issued Mar. 31, 2016 corresponding to Korean Application No. KR 10-2014-0161770.

*Primary Examiner* — Khai M Nguyen
(74) *Attorney, Agent, or Firm* — Mintz Levin Cohn Ferris Glovsky and Popeo, P.C.; Peter F. Corless

(57) ABSTRACT

A method for servicing a call with a door phone includes: requesting, by a server on a network supporting interworking between the door phone and a vehicle telematics terminal, vehicle information from the vehicle telematics terminal due to a service request from a smart terminal in a home in response to an action of the door phone; receiving, at the server, the vehicle information from the vehicle telematics terminal; and providing, by the server, a call connection between the door phone and the vehicle telematics terminal based on whether or not a vehicle is being driven, as determined by the received vehicle information.

9 Claims, 2 Drawing Sheets

(56) References Cited

FOREIGN PATENT DOCUMENTS

| KR | 10-2005-0054611 A | 6/2005 |
| KR | 10-2005-0060718 A | 6/2005 |
| KR | 10-2007-0074360 A | 7/2007 |
| KR | 10-2011-0068782 A | 6/2011 |
| KR | 10-1049049 B1 | 7/2011 |

* cited by examiner

METHOD AND SYSTEM FOR SERVICING CALL WITH DOORPHONE USING TELEMATICS

CROSS-REFERENCE TO RELATED APPLICATION

This application claims the benefit of and priority to Korean Patent Application No. 10-2014-0161770, filed on Nov. 19, 2014 in the Korean Intellectual Property Office, the disclosure of which is incorporated herein in its entirety by reference.

TECHNICAL FIELD

The present disclosure relates to a method and a system for servicing a call between a door phone and an external terminal, and more particularly, to a method and a system for servicing a call with a door phone using telematics.

BACKGROUND

Devices by which a person visiting a home may generate a ring-tone in the home, such as a doorbell, a video phone, a door phone, and the like, have been generally used. For instance, when the visitor pushes the button of a door phone, a video of the visitor, as taken by a camera, can be displayed on a smart terminal in the home. Then, a user in the home can verify the video of the visitor and make a call (depending on a call connection between the smart terminal and the door phone) to the door phone, or push a button to unlock a door lock, thereby making it possible to open the door remotely.

However, in a situation in which it is difficult to respond through the smart terminal, e.g., when there is nobody in the home, an unspecified visitor can be informed that there is no one home, which may pose safety concerns. Similarly, in a situation where only elderly or sick persons are in the home, those persons may feel uneasy due to a visit of an unspecified visitor.

In order to solve this problem, technology has been developed where a call can be made to a mobile terminal, such as a smart phone, or the like, of a customer (who is registered in advance) when the button of the door phone is pushed. However, even in this case, a safety concerns still exist. For instance, a driver of a vehicle may be distracted due to a sudden call from a visitor while driving.

SUMMARY

The present disclosure has been made to solve the above-mentioned problems occurring in the related art while advantages achieved by the related art are maintained intact.

An aspect of the present disclosure provides a method and a system for servicing a call with a door phone using telematics capable of reducing a risk situation (e.g., distraction of a driver due to a sudden call from a visitor, or the like) by connecting a terminal of the vehicle (e.g., smart car) or a mobile terminal to a door phone in order to allow the service user to make a call with a visitor while viewing a video of the visitor as if the service user stays at home.

According to embodiments of the present disclosure, a method for servicing a call with a door phone includes: requesting, by a server on a network supporting interworking between the door phone and a vehicle telematics terminal, vehicle information from the vehicle telematics terminal due to a service request from a smart terminal in a home in response to an action of the door phone; receiving, at the server, the vehicle information from the vehicle telematics terminal; and providing, by the server, a call connection between the door phone and the vehicle telematics terminal based on whether or not a vehicle is being driven, as determined by the received vehicle information.

The method may further include providing, by the server, a call connection between the door phone and a user terminal when the vehicle is not being driven.

The smart terminal may perform the service request when in a service mode and outputs a ring-tone into the home when in a general mode.

The receiving of the vehicle information may include receiving the vehicle information including information indicating a possibility of the vehicle being driven and information for pairing with a user terminal.

The information indicating the possibility of the vehicle being driven may include one or more of: key on/off information, engine ignition on/off information, gear position information, and vehicle velocity information, and the information for pairing with the user terminal may include information for pairing via one or more of: near field wireless communication, universe serial bus (USB) wired communication, and mobile communication.

The providing of the call connection may include providing the call connection based on the possibility of the vehicle being driven and a pairing state between the vehicle telematics terminal and the user terminal.

The receiving of the vehicle information may include receiving the vehicle information including information indicating a possibility of the vehicle being driven, global positioning system (GPS) information of the vehicle, and GPS information of a user terminal.

The providing of the call connection may include providing the call connection based on the possibility of the vehicle being driven and a possibility that a user is present in a vicinity of the vehicle according to a comparison of a position of the vehicle and a position of the user terminal.

The receiving of the vehicle information may include receiving the vehicle information including authentication information authenticated by a user-unique information authentication means, and the providing of the call connection may include providing the call connection based on whether or not the authentication information is normal.

The providing of the call connection may include receiving, during the call connection, a video and audio feed of a closed-circuit television (CCTV) camera or a separate digital camera installed in front of a door from the smart terminal and a video feed from a camera of the door phone; and transmitting the received audio and video feeds to the vehicle telematics terminal.

The action of the door phone may be a push of a bell button of the door phone.

Furthermore, according to embodiments of the present disclosure, a system for servicing a call with a door phone includes: a server on a network configured to support a call service by interworking between the door phone and a vehicle telematics terminal, wherein the server includes: a vehicle information inquiring unit configured to request vehicle information from the vehicle telematics terminal due to a service request from a smart terminal in a home in response to an action of the door phone and to receive the vehicle information; and a call connecting unit configured to provide a call connection between the door phone and the vehicle telematics terminal based on whether or not a vehicle is being driven, as determined by the received vehicle information.

The call connecting unit may be further configured to provide a call connection between the door phone and a user terminal when the vehicle is not being driven.

The smart terminal may perform the service request when in a service mode and outputs a ring-tone into the home when in a general mode.

The vehicle information inquiring unit may be further configured to receive the vehicle information including information indicating a possibility of the vehicle being driven and information for pairing with a user terminal.

The information indicating the possibility of the vehicle being driven may include one or more of: key on/off information, engine ignition on/off information, gear position information, and vehicle velocity information, and the information for pairing with the user terminal may include pairing information by one or more of: near field wireless communication, USB wired communication, and mobile communication.

The call connecting unit may be further configured to provide the call connection based on the possibility of the vehicle being driven and a pairing state between the vehicle telematics terminal and the user terminal.

The vehicle information inquiring unit may be further configured to receive the vehicle information including information indicating a possibility of the vehicle being driven, GPS information of the vehicle, and GPS information of a user terminal.

The call connecting unit may be further configured to provide the call connection based on the possibility of the vehicle being driven and a possibility that the user is present in a vicinity of the vehicle according to a comparison of a position of the vehicle and a position of the user terminal.

The vehicle information inquiring unit may be further configured to receive the vehicle information including authentication information authenticated by a user-unique information authentication means, and the call connecting unit may be further configured to provide the call connection based on whether or not the authentication information is normal.

The call connecting unit may be further configured to receive, during the call connection, a video and audio feed of a CCTV camera or a separate digital camera installed in front of a door from the smart terminal and a video feed from a camera of the door phone and to transmit the received audio and video feeds to the vehicle telematics terminal.

The action of the door phone may be a push of a bell button of the door phone

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
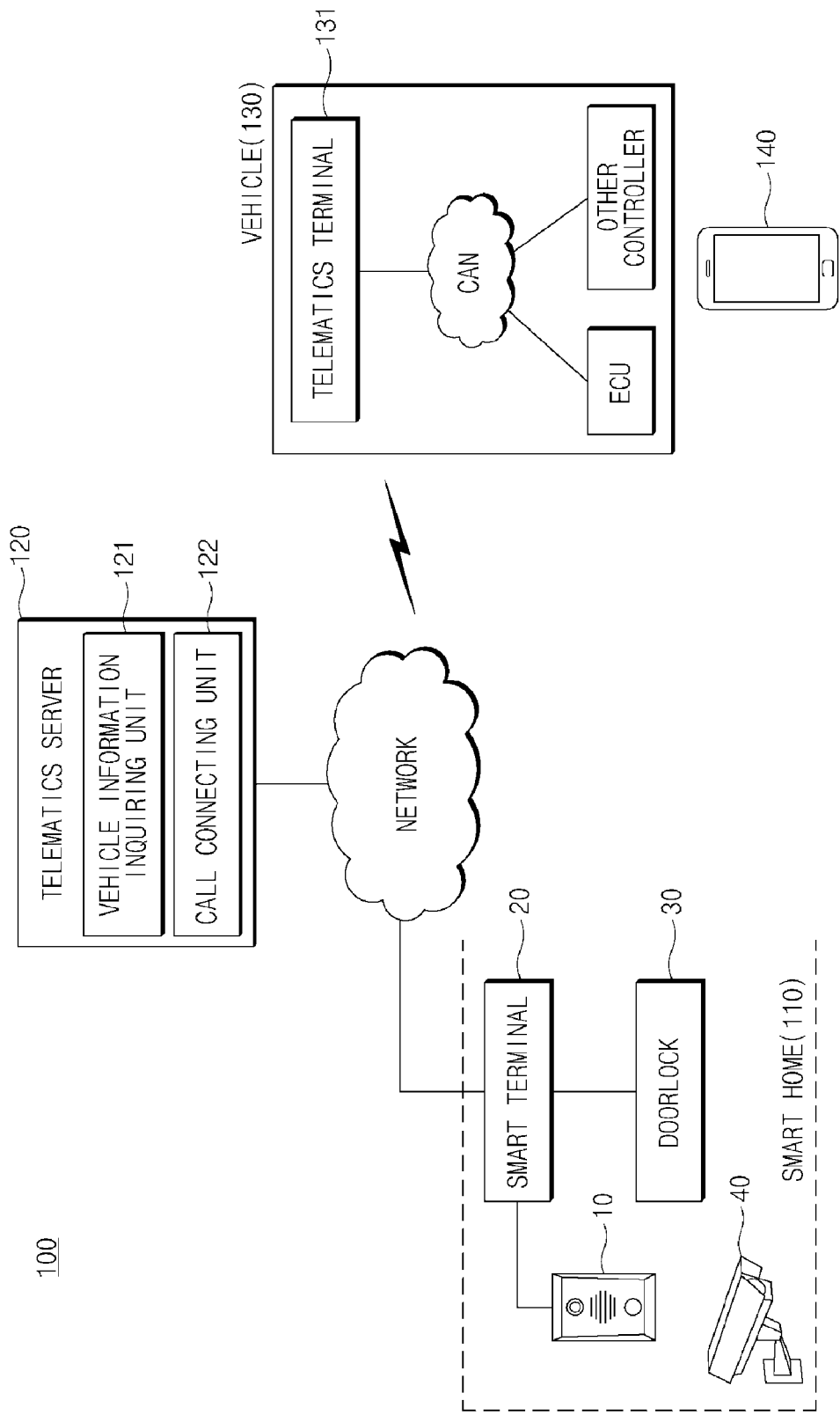
FIG. 1 is a view for describing a system for servicing a call with a door phone using telematics according to embodiments of the present disclosure.

Hereinafter, the present disclosure will be described in detail with reference to the accompanying drawings. Here, throughout the accompanying drawings, the same components will be denoted by the same reference numerals. In addition, a detail description for functions and/or configurations that have been well-known will be omitted. In the following specification, portions required for understanding operations according to embodiments will be mainly described, and a description for components that may obscure the gist of the present disclosure will be omitted. In addition, some components in the accompanying drawings may be exaggerated, omitted, or schematically shown. Sizes of the respective components do not reflect actual sizes of the respective components. Therefore, contents mentioned herein are not limited by relative sizes of or intervals between components shown in the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

FIG. 1 is a view for describing a system 100 for servicing a call with a door phone using telematics according to embodiments of the present disclosure.

Referring to FIG. 1, the system 100 for servicing a call with a door phone using telematics according to embodiments of the present disclosure is configured to include a smart home 110, a telematics server 120, a vehicle 130, and a user terminal 140 that interwork with each other by wired and wireless networks.

The smart home 110 and the telematics server 120 may interwork with each other through wired and wireless networks supporting wired Internet communication, wireless Internet communication such as WiFi, Wibro, or the like, mobile communication such as wideband code division multiple access (WCDMA), long term evolution (LTE), or the like, or wireless communication such as wireless access in vehicular environment (WAVE), or the like, and the vehicle 130 and the telematics server 120 may interwork with each other through a wireless network supporting the wireless Internet communication such as the WiFi, the Wibro, or the like, the mobile communication such as the WCDMA, the LTE, or the like, or the wireless communication such as the WAVE, or the like, due to characteristics of the vehicle 130 having mobility.

The user terminal 140, which is an electronic device that may communicate with a door phone 10 within the smart home 110 through a relay of the telematics server 120, may include wireless terminals such as a smart phone, a wearable device that may make an audio/video call, a tablet personal computer (PC), a laptop PC, and the like.

The smart home 110 may include the door phone 10 installed outside a door and including a camera (e.g., a digital camera), a speaker, a microphone, a bell button, etc., a smart terminal 20 installed in the home so as to be connected to the door phone 10 and including a display, a speaker, a microphone, an unlocking button of a doorlock 30, etc., and the like. In addition, a closed-circuit television (CCTV) camera or a separate digital camera 40 may be further installed in front of the door (or outside the door) to transmit a corresponding photographed video to the smart terminal 20. Particularly, a user may set an operation mode of the smart terminal 20 to a general mode or a service mode.

In the case in which the operation mode of the smart terminal 20 is set to the general mode, when a visitor pushes the bell button of the door phone 10, a ring-tone may be output into the home through the speaker, a video photographed by the camera of the door phone 10 may be displayed on the display of the smart terminal 20, and a call may be made by an interphone function through the speaker and the microphone of the door phone 10 and the speaker and the microphone of the smart terminal 20. In addition, in the case in which the operation mode of the smart terminal 20 is set to the service mode, when the visitor pushes the bell button of the door phone 10, the smart terminal 20 requests the telematics server 120 on the network to provide the service according to the present disclosure. Therefore, as described below, the telematics server 120 may perform a relay so that a call connection is made by interworking between the door phone 10 and a vehicle telematics terminal 131 or the user terminal 140. The service according to the present disclosure will be described in detail later with reference to FIG. 2.

The vehicle 130 may include the telematics terminal 131, an engine control unit (ECU), other control units, and the like, that may interwork with each other through controller area network (CAN) communication. The telematics terminal 131 may include a predetermined modem to support the wireless communication as described above with the telematics server 120 on the network, thereby allowing the vehicle 130 to transmit and receive required data to and from the telematics server 120. In addition, the telematics terminal 131 may be configured so as to have a unique number such as a phone number, or the like, assigned thereto to perform a communication such as a call with an external communication terminal, and may include a microphone and a speaker for a telephone call.

Here, devices such as the telematics terminal 131, the ECU, other control units, and the like, may be connected to a CAN bus through a gateway (not shown). Other control units other than the ECU, which are various control units or electronic modules performing CAN communication within the vehicle, may include devices performing CAN communication (P-CAN) of a power train related field, CAN communication (C-CAN) of a chassis related field, CAN communication (B-CAN) of a body related field, CAN communication (M-CAN) of a multimedia related field. A detailed description for the devices as described above will be omitted.

Particularly, in the present disclosure, the telematics server 120 on the network for supporting a call service by interworking between the door phone 10 and the vehicle telematics terminal 131 may include a vehicle information inquiring unit 121 and a call connecting unit 122. The respective components of the telematics server 120 as described above may be implemented by hardware, software, or a combination of the hardware and the software.

First, functions of the respective components of the telematics server 120 will be briefly described.

The vehicle information inquiring unit 121 may request the telematics terminal 131 to transmit vehicle information depending on a service request from the smart terminal 20 in the home by push of the bell button of the door phone 10 by the visitor, and receive the vehicle information.

The call connecting unit 122 may provide a call connection between the door phone 10 and the telematics terminal 131 depending on whether or not the vehicle 130 is being driven based on the vehicle information received by the vehicle information inquiring unit 121. In addition, the call connecting unit 122 may also provide a call connection between the door phone 10 and the user terminal 140 in the case in which the vehicle 130 is not being driven.

Since the call connection is supported by the interworking between the door phone 10 and the vehicle telematics terminal 131 or the user terminal 140 through the relay of the telematics server 120 on the network according to the present disclosure as described above, in the present disclosure, a service user such as a driver, or the like, naturally makes a call by a hands-free function, or the like, while viewing a video of the visitor through the telematics terminal 131 of the vehicle (e.g., a smart car) or a wireless or mobile terminal 140, thereby making it possible to decrease driving hindrance factors as compared with an existing service providing only a call with a mobile terminal.

In addition, even in a situation in which it is difficult to make a response through the smart terminal 20 such as the case in which there is nobody in the home, there are only old and/or weak persons in the home, or the like, the system 100 for servicing a call with a door phone using telematics according to embodiments of the present disclosure allows outside visitors or potential invaders to feel as if there are persons in the home, in order to relieve uneasiness of a customer. Therefore, it is possible to care for the customer, and allows a CCTV video, or the like, together with a video or picture (depending on communication speed and charge) of the visitor photographed by the door phone 10 to be viewed at the time of making a call in the case in which the CCTV camera or the separate digital camera 40 photographing the surrounding of the door is installed in front of the home, thereby making it possible to confirm a situation in front of the home by the CCTV video, or the like, even in the case in which it is difficult to confirm a face of the visitor by the video of the door phone 10 and appropriately cope with the confirmed situation.

Figure 2:
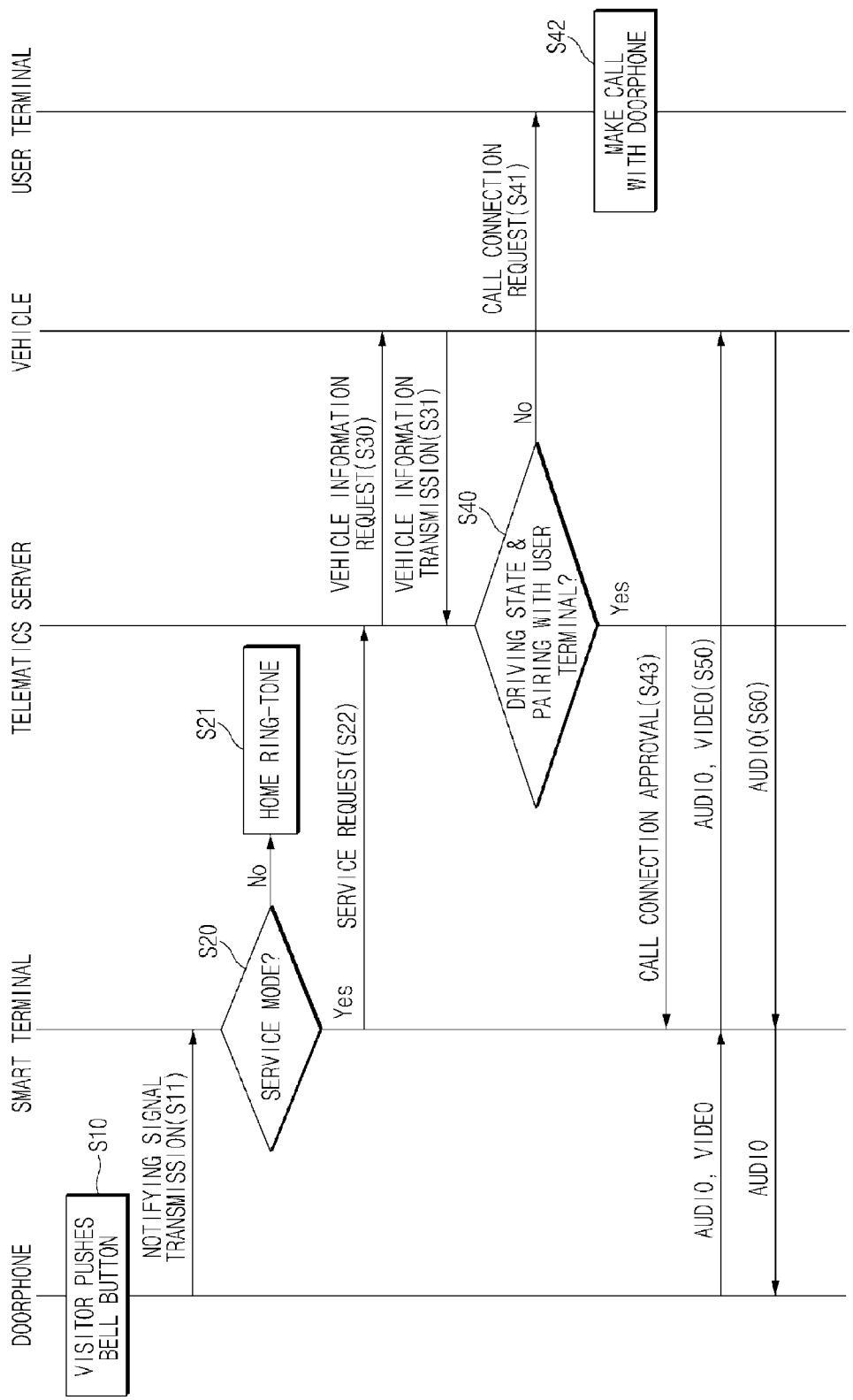
FIG. 2 is a flow chart for describing operations of the system for servicing a call with a door phone using telematics according to embodiments of the present disclosure.

Hereinafter, operations of the system 100 for servicing a call with a door phone using telematics according to embodiments of the present disclosure will be described in more detail with reference to a flow chart of FIG. 2.

First, the visitor that is to visit a home of the driver or the user pushes the bell button of the door phone 10 (S10). A corresponding notifying signal is transmitted to the smart terminal 20 (S11).

The smart terminal 20 receiving the corresponding notifying signal confirms a corresponding set mode set in the smart terminal 20 by the user (S20) and controls the speaker to output a ring-tone in the home (S21) in the case in which the corresponding set mode is not a service mode according to the present disclosure, but is a general mode. In the case in which the mode set in the smart terminal 20 is the general mode, when the visitor pushes the bell button of the door phone 10 as described above, the smart terminal 20 may output the ring-tone into the home through the speaker, the video photographed by the camera of the door phone 10 may be displayed on the display of the smart terminal 20, and the call may be made by the interphone function through the speaker and the microphone of the door phone 10 and the speaker and the microphone of the smart terminal 20.

In the case in which it is confirmed in S20 the mode set in the smart terminal 20 is the service mode according to the present disclosure, the smart terminal 20 requests the telematics server 120 on the network according to the present disclosure to provide the service as described below (S22). Therefore, as described below, the telematics server 120 may perform the relay so that the call connection is made by the interworking between the door phone 10 and the vehicle telematics terminal 131 or the user terminal 140.

That is, the vehicle information inquiring unit 121 of the telematics server 120 receiving the service request from the smart terminal 20 may request the telematics terminal 131 of the vehicle 130 to transmit the vehicle information (S30), and may receive the vehicle information (S31). Here, the vehicle information inquiring unit 121 may receive information that may indicate a possibility of the vehicle being driven, information on pairing (e.g., with the user terminal 140) in a state in which communication is possible so as to transmit and receive data to and from the user terminal 140, and the like, as the vehicle information from the telematics terminal 131 of the vehicle 130. The vehicle information is requested and received in order to prevent dispersion of concentration of the driver, and is used as information that may decide whether or not the driver is to drive the vehicle with seating on a driver's seat, whether or not the driver is to drive the vehicle with the user terminal 140 connected to the telematics terminal 131, and the like.

For example, the telematics terminal 131 of the vehicle 130 may manage the information that may check the driving possibility of the vehicle 130 such as key on/off information (e.g., information on power on/off states in which a key for a vehicle start is inserted) of the vehicle, engine ignition on/off information (e.g., information on engine start on/off states by a vehicle key, or the like), gear position information, vehicle velocity information, or the like, based on signals of various control units, such as the ECU, and the like, through a CAN, and transmit the above-mentioned information depending on the vehicle information request of the telematics server 120. The information indicating the possibility of the vehicle being driven may be used as information that may help to decide whether or not the driver is will be or is driving the vehicle while sitting in the driver's seat, whether or not the driver will be or is driving the vehicle with the user terminal 140 connected to the telematics terminal 131, whether the driver has temporarily stopped the vehicle (e.g., while waiting for a signal) in a vehicle velocity '0' state, whether the driver has temporarily stopped the vehicle in gear position 'P (Parking)' state, and the like.

In addition, the telematics terminal 131 of the vehicle 130 may manage the information on the pairing with the user terminal 140 such as near field wireless communication (e.g., Bluetooth, Zigbee, near field communication (NFC), or the like), universal serial bus (USB) wired communication, or mobile communication for example, WCDMA, LTE, WiFi, WiBro, WAVE, or the like, and may transmit the above-mentioned information depending on the vehicle information request of the telematics server 120.

When the vehicle information inquiring unit 121 receives the vehicle information such as the information that may check the driving possibility of the vehicle 130, the information on the pairing between the telematics terminal 131 and the user terminal 140, and the like, as described above, the call connecting unit 122 may provide the call connection between the door phone 10 and the telematics terminal 131 depending on whether or not the vehicle 130 is being driven based on the vehicle information received by the vehicle information inquiring unit 121 (S40). That is, the call connecting unit 122 may decide the possibility of the vehicle being driven by the driver or the user by the above-mentioned information and the pairing state between the telematics terminal 131 and the user terminal 140 and provide the call connection between the door phone 10 and the telematics terminal 131 accordingly.

In addition, the call connecting unit 122 may also provide a call connection between the door phone 10 and the user terminal 140 in the case in which it is decided that the vehicle 130 is not being driven (S40). For example, the call connecting unit 122 may make a request to connect a call to a phone number of the user terminal 140 registered in advance (S41), and perform a relay so that the call connection is made between the smart terminal 20 and the user terminal 140 when the user terminal 140 confirms a call button, thereby allowing an audio of the visitor in front of the door phone 10 connected to the smart terminal 20 or a video of the visitor photographed by the camera of the door phone 10 to be transmitted to the user terminal 40 via the telematics server 120 through the smart terminal 20 and allowing an audio input to the user terminal 140 to be transmitted to the door phone 10 via the smart terminal 20 through the telematics server 120 (S42).

Meanwhile, in the case in which it is decided that the vehicle 130 is being driven (S40), the call connecting unit 122 may approve the call connection for the corresponding service request to the smart terminal 20 (S43). Therefore, the call connecting unit 122 may perform the relay so that the call connection is made between the smart terminal 20 and the telematics terminal 131 or the user terminal 140 paired with the telematics terminal 131 (S50 and S60). In this case, the audio of the visitor in front of the door phone 10 connected to the smart terminal 20 or the video (e.g., a still video, a moving picture, or the like) of the visitor photographed by the camera of the door phone 10 is transmitted to the telematics terminal 131 via the telematics server 120 through the smart terminal 20, such that the corresponding video may be displayed on the display of the telematics terminal 131, and a hands-free function may be supported so that the corresponding audio is output through the speaker.

In addition, the corresponding video may also be displayed through the user terminal 140 paired with the telematics terminal 131, and the corresponding audio may also be output through a speaker of the user terminal 140 (S50). In addition, an audio input to the microphone of the telematics terminal 131 depending on the hands-free function may be transmitted to the door phone 10 via the smart terminal 20 through the telematics server 120, or an audio input to a microphone of the user terminal 140 paired with the telematics terminal 131 may also be transmitted to the door phone 10 via the smart terminal 20 through the telematics server 120 (S60). Even though the user terminal 140 is paired with the telematics terminal 131, the speaker and the microphone of the telematics terminal 131 rather than the speaker and the microphone of the user terminal 140 may be set to be used for a call in order to prevent a distraction of the driver. A natural call without a sense of difference may be made between the visitor and the user such as a house owner, or the like due to the call connection between the door phone 10 and the telematics terminal 131 or the user terminal 140 paired with the telematics terminal 131 as described above.

Meanwhile, in S31, the vehicle information inquiring unit 121 may further receive global positioning system (GPS) information of the vehicle, GPS information of the user terminal 140, and the like, in addition to the information that may indicate the possibility of the vehicle 130 being driven (e.g., the key on/off information of the vehicle, the engine ignition on/off information, gear position information, vehicle velocity information, or the like) or the information on the pairing between the telematics terminal 131 and the user terminal 140 as described above as the vehicle information from the telematics terminal 131. The call connecting unit 122 may decide the possibility of the vehicle being driven by the user in a vehicle start-on condition using the information that may indicate the possibility of the vehicle being driven, decide the possibility that the user will be present in the vicinity of the vehicle by a comparison of a position of the vehicle 130 and a position of the user terminal 140, determine whether or not the user is or will be driving the vehicle in the case in which the positions of the user terminal 140 and the vehicle 130 are substantially the same as each other within a predetermined distance, and perform the call connection (S43, S50, and S60).

In addition, in S31, the vehicle information inquiring unit 121 may further receive authentication information authenticated by a user unique information authentication means, or the like, in addition to the above-mentioned vehicle information, from the telematics terminal 131. The telematics terminal 131 may be connected to the user unique information authentication means, which may recognize an input fingerprint, iris, password, or the like, to authenticate whether or not the input fingerprint, iris, password, or the like, is normal, thereby performing a control so that the vehicle may be driven, and the authentication information depending on the authentication as described above may be transmitted when the vehicle information inquiring unit 121 requests the telematics terminal 131 to transmit the vehicle information. The call connecting unit 122 may decide whether or not the authentication information is normal and perform the call connection in the case in which the user normally drives the vehicle 130 through authentication (S43, S50, and S60).

In S50 as described above, the call connecting unit 122 may further receive video and/or audio feeds of the CCTV camera or the separate digital camera installed in front of the door from the smart terminal 20 and the video feed from a camera of the door phone 10 during the call connection and transmit the received audio and video images to the telematics terminal 131 or the user terminal 140 paired with the telematics terminal 131. To this end, the CCTV camera, the digital camera, or the like, that may photograph the surrounding of the door may be installed in front of the door, the camera video of the door phone 10 and the video (e.g., a still video, a moving picture, or the like) of the CCTV camera or the digital camera are combined with each other and are then transmitted to the telematics terminal 131 or the user terminal 140 paired with the telematics terminal 131, such that the user may better recognize a situation in front of the door through the video of the CCTV camera or the digital camera even in the case in which it is difficult to identify a person through a face, or the like, of the visitor using the camera video of the door phone 10 and appropriately cope with the recognized situation.

As set forth above, with the method and the system 100 for servicing a call with a door phone using telematics according to embodiments of the present disclosure, the service user such as the driver, or the like, naturally makes the call (e.g., by a hands-free function, or the like), while viewing the video of the visitor through the telematics terminal 131 of the vehicle (e.g., smart car) or the mobile terminal 140, thereby making it possible to decrease the driving hindrance factors as compared with the existing service providing only the call with the mobile terminal. In addition, even in the situation in which it is difficult to make a response through the smart terminal such as the case in which there is nobody in the home, there are old or weak persons in the home, or the like, the system 100 for servicing a call with a door phone using telematics according to embodiments of the present disclosure allows the outside visitors or the potential invaders feel as if there are persons in the home in order to relieve any uneasiness of the customer, thereby providing for better care of the customer.

Particularly, an attempt to confirm the video for the situation in front of the home may cause serious distraction of the driver while the vehicle is driven. It is automatically confirmed whether or not the driver is driving the vehicle before the call connection and the natural call connection is made by the hands-free function according to the service of the present disclosure, thereby making it possible to prevent a violent crime, such as a trespass in a house of the customer, in advance while minimizing the attention dispersion of the driver as compared with an existing cellular phone call connection scheme.

In addition, in the case in which a CCTV device photographing the surrounding of the door is installed in front of the home, the driver may view the CCTV video together with the video of the visitor photographed by the door phone at the time of making a call in the vehicle 130, thereby making it possible to confirm the situation in front of the home by the CCTV video, even in the case in which it is difficult to confirm the face of the visitor by the video of the door phone and appropriately deal with the confirmed situation. These services, regardless of whether a visitor pushes to the bell button of the door phone 10, according to a request of telematics terminal 131 or the user terminal 140 paired to the telematics terminal 131, may be made by the relay of the call connecting unit 122. For example, the driver may identify whether the visitor does not intentionally answer, or someone paces around in front of the home, through a real-time video or a still image of the visitor photographed by the door phone 10 or the CCTV camera.

Hereinabove, although the present disclosure has been described by specific matters such as detailed components, and the like, embodiments, and the accompanying drawings, they have been provided only for assisting in the entire understanding of the present disclosure. Therefore, the present disclosure is not limited to the above-mentioned embodiments, but may be variously modified and altered by those skilled in the art to which the present disclosure pertains without departing from the spirit and scope of the present disclosure. Therefore, the present disclosure is not to be limited to the above-mentioned embodiments. That is, the following claims as well as all contents modified equally or equivalently to the claims are to fall within the scopes and spirits of the disclosure.

What is claimed is:

1. A system for servicing a call with a door phone comprising:
   a server on a network configured to support a call service by interworking between the door phone and a vehicle telematics terminal equipped in a vehicle,
   wherein the server includes:
      a vehicle information inquiring unit configured to request vehicle information from the vehicle telematics terminal due to a service request from a smart terminal in a home in response to an action of the door phone and to receive the vehicle information including information indicating a possibility of the vehicle being driven and information for pairing with a user terminal; and a call connecting unit configured to provide a call connection between the door phone and the vehicle telematics terminal based on whether or not the vehicle is being driven, as determined by the received vehicle information.

2. The system according to claim 1, wherein the call connecting unit is further configured to provide a call connection between the door phone and the user terminal when the vehicle is not being driven.

3. The system according to claim 1, wherein the smart terminal performs the service request when in a service mode and outputs a ring-tone into the home when in a general mode.

4. The system according to claim 1, wherein:
the information indicating the possibility of the vehicle being driven includes one or more of: key on/off information, engine ignition on/off information, gear position information, and vehicle velocity information, and
the information for pairing with the user terminal includes pairing information by one or more of: near field wireless communication, USB wired communication, and mobile communication.

5. The system according to claim 4, wherein the call connecting unit is further configured to provide the call connection based on the possibility of the vehicle being driven and a pairing state between the vehicle telematics terminal and the user terminal.

6. The system according to claim 1, wherein the vehicle information inquiring unit is further configured to receive the vehicle information including information indicating the possibility of the vehicle being driven, GPS information of the vehicle, and GPS information of the user terminal.

7. The system according to claim 6, wherein the call connecting unit is further configured to provide the call connection based on the possibility of the vehicle being driven and a possibility that the user is present in a vicinity of the vehicle according to a comparison of a position of the vehicle and a position of the user terminal.

8. The system according to claim 1, wherein:
the vehicle information inquiring unit is further configured to receive the vehicle information including authentication information authenticated by a user-unique information authentication means, and
the call connecting unit is further configured to provide the call connection based on whether or not the authentication information is normal.

9. The system according to claim 1, wherein the call connecting unit is further configured to receive, during the call connection, a video and audio feed of a CCTV camera or a separate digital camera installed in front of a door from the smart terminal and a video feed from a camera of the door phone and to transmit the received audio and video feeds to the vehicle telematics terminal.

* * * * *